United States Patent [19]

Inoue et al.

[11] Patent Number: 4,629,953
[45] Date of Patent: Dec. 16, 1986

[54] CONTROL CIRCUIT FOR SLIDING ROOF DEVICES

[75] Inventors: Toshihiro Inoue; Kazuhiro Ozawa; Yoshinobu Kimura, all of Saitama, Japan

[73] Assignee: Honda Giken Kogyo Kabushiki Kaisha, Tokyo, Japan

[21] Appl. No.: 785,477

[22] Filed: Oct. 8, 1985

[30] Foreign Application Priority Data

Oct. 9, 1984 [JP] Japan .................................. 59-212262

[51] Int. Cl.⁴ .............................................. B60J 7/05
[52] U.S. Cl. ..................................... 318/468; 318/256; 318/266; 318/286; 296/223
[58] Field of Search ............... 318/256, 265, 266, 267, 318/280, 286, 466, 467, 468; 296/216, 223, 210, 221, 222

[56] References Cited

U.S. PATENT DOCUMENTS

| | | | |
|---|---|---|---|
| 3,702,430 | 11/1972 | Knetsch | 318/468 |
| 4,420,185 | 12/1983 | Bienert et al. | 296/223 |
| 4,436,338 | 3/1984 | Jardin | 296/223 |
| 4,438,972 | 3/1984 | Katayama et al. | 296/223 |

Primary Examiner—William M. Shoop, Jr.
Assistant Examiner—Bentsu Ro
Attorney, Agent, or Firm—Irving M. Weiner; Joseph P. Carrier; Pamela S. Burt

[57] ABSTRACT

For a sliding roof device (100) having a panel transfer mechanism (11, 12, 13b, 31, 33, 34, 7, 21) for moving a roof panel (2), which is adapted to open and close a roof opening (3a) of a roof (1), between a close position and an open position, a tilt-up mechanism (11, 12, 13a, 32, 33, 34, 7, 21) for moving the roof panel between the close position and a tilt-up position, and a reversible electric motor (51) for actuating the panel transfer mechanism and the tilt-up mechanism, there is provided a control circuit (50) including a first operation switch (58) for actuating the motor to thereby have the roof panel moved from the close position to the open position and the tilt-up position, and a second operation switch (57) for actuating the motor to thereby have the roof panel moved from the open position and the tilt-up position to the close position. The first operation switch (58) is adapted for a single continuous operation thereof for actuating the motor (51) to thereby have the roof panel (2) contiñuously moved from the tilt-up position to the open position or vice versa.

4 Claims, 9 Drawing Figures

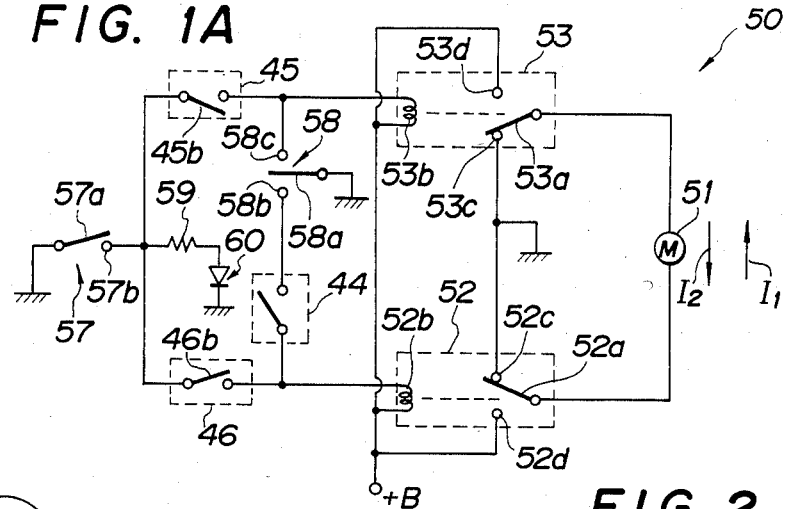
FIG. 1A
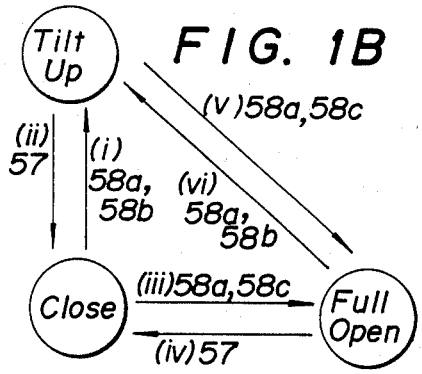
FIG. 1B
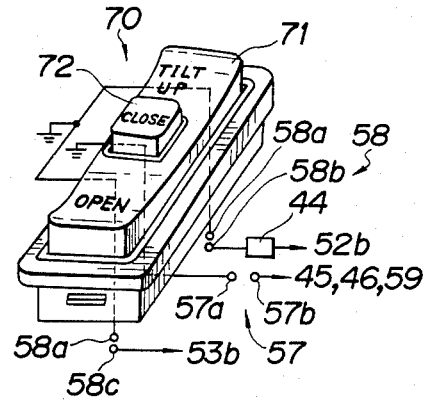
FIG. 2
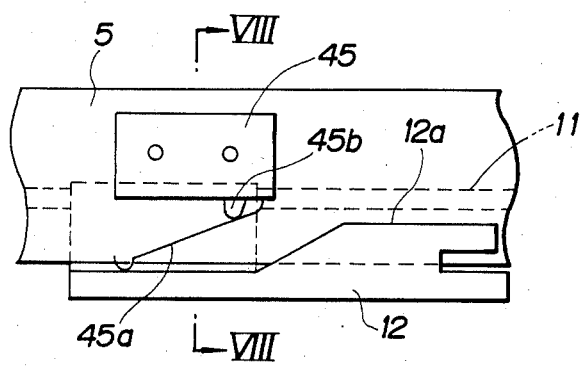
FIG. 7
FIG. 8

CONTROL CIRCUIT FOR SLIDING ROOF DEVICES

BACKGROUND OF THE INVENTION

1. Field of the Invention

The present invention generally relates to a control circuit for sliding roof devices. More particularly, the invention relates to a control circuit for sliding roof devices of a type in which a mobile member such as a roof panel for opening and closing a roof opening of a vehicle is driven with a forward-reverse rotatable electric motor through a transmission element.

2. Description of Relevant Art

There are known control circuits for sliding roof devices of a type in which an electric motor interconnected through a transmission element with a roof panel is controlled to be actuated in a pole-reversing manner for opening and closing a roof opening of a vehicle. In such type of sliding roof device, in general, the roof panel is moved out of a close position thereof, where it fully closes the roof opening, to an open position thereof, where it has fully opened the roof opening, or from the close position to what is called a tilt-up position thereof.

As an example of control circuit for such sliding roof device, there has been disclosed one in U.S. Pat. No. 3,702,430, patented on Nov. 7, 1972.

According to this United States Patent, an invention has been achieved to solve an old problem found in sliding roof devices of the type described. Such old problem was that when the roof panel was returned from the tilt-up position or the open position to the close position, it was difficult to automatically stop the panel-driving electric motor and the motor was thus unnecessarily left actuated for a period of time.

To solve this problem, in the control circuit according to this U.S. Patent, there were utilized a cam switch for detecting the close position of the roof panel and an impulse relay cooperating with the cam switch, whereby the electric motor was automatically stopped when the panel was returned from the tilt-up position or the open position to the close position. In this respect, when the roof panel was moved from the close position to the tilt-up position or the open position, quite conventionally a motor-starting switch was turned off to stop the electric motor, or otherwise the panel was brought into engagement with a stopper member disposed at a predetermined position to thereby operate a well-known slip clutch interposed between an output shaft of the motor and the transmission element.

According to this United States Patent, an effective solution was made of the old problem.

However, with the control circuit according to this U.S. Patent, with which the electric motor was once automatically stopped when the roof panel was returned to the close position, it was impossible by way of a single continuous switch operation to move the panel from the tilt-up position to the open position or vice versa.

In this respect, for a control circuit for sliding roof devices of the type described, although, as was in the aforesaid United States Patent, it still is a desideratum to permit the roof panel to be continuously moved between the tilt-up position and the close position, as well as between the close position and the open position, years have raised an additional desideratum of offering greater convenience by permitting the roof panel to be moved with a single continuous switch operation from the tilt-up position also to the open position or vice versa, when necessary.

The present invention has been achieved to effectively substantiate such desiderata in a conventional control device for sliding roof devices of the class described.

SUMMARY OF THE INVENTION

According to the present invention, there is provided, in a control circuit 50 for a sliding roof device 100 having a roof panel 2 adapted to open and close a roof opening 3a defined by an opened part 3 of a roof 1 and to be selectively adjustable between a close position thereof, a tilt-up position thereof, and an open position thereof, a panel transfer means 11, 12, 13b, 31, 33, 34, 7, 21 for moving the roof panel between the close position and the open position, a panel tilt-up means 11, 12, 13a, 32, 33, 34, 7, 21 for moving the roof panel between the close position and the tilt-up position, and a reversible electric motor means 51 for driving the panel transfer means and the panel tilt-up means, the control circuit including; a first operation switch means 58 for actuating the motor means to thereby have the roof panel moved from the close position to the tilt-up position and from the close position to the open position, and a second operation switch means 57 for actuating the motor means to thereby have the roof panel moved from the tilt-up position and the open position to the close position, an improvement comprising; the first operation switch means 58 being adapted for a single continuous operation thereof for actuating the motor means to thereby have the roof panel continuously moved from the tilt-up position to the open position and from the open position to the tilt-up position.

Accordingly, an object of the present invention is to provide a control circuit for sliding roof devices which, besides permitting a roof panel to continuously move between a close position thereof and a tilt-up position thereof as well as between the close position and an open position thereof, enables the roof panel to be transfered from the tilt-up position to the open position or vice versa by way of a single continuous switch operation.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

In the drawings:

FIG. 1A is a circuit diagram of a control circuit according to a preferred embodiment of the invention;

FIG. 1B is a flow chart describing functions of the control circuit of FIG. 1A;

FIG. 2 is a perspective view showing a specifically embodied example of an operation switch of the control circuit of FIG. 1A;

FIG. 7 is an enlarged plan view of a slider for actuating the roof panel of FIGS. 3 to 6; and FIG. 8 is a sectional view taken along line VIII—VIII of FIG. 7.

DETAILED DESCRIPTION OF THE PREFERRED EMBODIMENT

Figure 3:
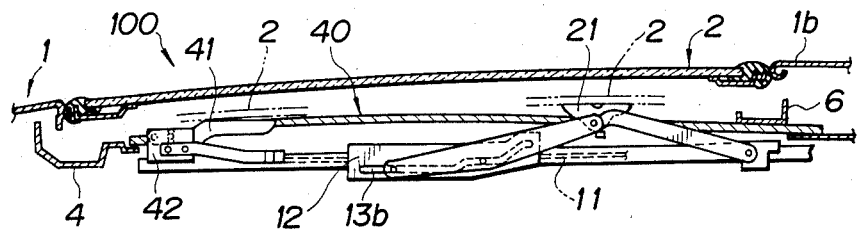
FIG. 3 is a side view of an essential part of a sliding roof, as it is in a state that a roof panel and a sunshade are put in close positions thereof, which sliding roof is controlled by the control circuit of FIG. 1A.

First, with reference to FIGS. 3 to 6, the constitution of a sliding roof device including a roof panel and a sunshade will be described, and particularly regarding the respective positions that the roof panel and the sunshade are adapted to take when operated. The sliding roof device is controlled by a control circuit according to a preferred embodiment of the present invention, which control circuit will be detailed later in conjunction with FIGS. 1A and 1B.

In each of FIGS. 3 to 6, the left corresponds to the front of an automotive vehicle (not shown) equipped with the sliding roof device, and the right, to the rear thereof.

In those Figures, designated by reference numeral 100 is the entirety of the sliding roof device. The roof device 100 includes the roof panel designated by reference numeral 2, which panel 2 is made of a transparent glass and adapted to open and close an opening 3a defined by an opened part 3 of a roof 1 of the vehicle. The opening 3a has a substantially rectangular form when viewed from above.

Under the open part 3 of the roof 1, the sliding roof device 100 has a roof frame 4 fixed to a vehicle body of the vehicle. The frame 4 extends substantially along a front portion and both side portions of the circumference of the roof opening 3a. It may preferably be further extended along a rear portion thereof, to serve as a stationary drain channel for draining water or rain drops dripping thereon from around the roof panel 2, as it is closed.

At both sides of the roof opening 3a are disposed a pair of guide rails 5 extending in the longitudinal direction of the vehicle. Under the rear side of the opened part 3, that is, under the front edge of a rear part 1b of the roof 1, there is arranged a mobile drain channel 6, extending in the transverse direction of the vehicle, for draining water or rain drops dripping thereon from the rear edge of the roof panel 2. Drain channel 6 is supported at both ends thereof with a pair of drain channel sliders 7 each respectively mounted on one of the guide rails 5 in a longitudinally slidable manner.

With the guide rails 5, 5 are engaged a pair of tilt-up sliders 12, respectively, which sliders 12 are longitudinally slidably operable with a pair of Bowden cables 11. In each of the sliders 12 is formed a winding elongate groove 13 having a flat front portion 13a and an upwardly stepped rear portion 13b.

The rear portion of the roof panel 2 is supported at both side portions thereof with a pair of rear stays 21.

In this respect, exemparily in FIG. 3, that portion of the roof panel 2 as represented by solid line is stretched between the front and the rear parts 1a, 1b of the roof 1, while that portion as represented by chained line is connected to the rear stays 21, and later described front stays 41. This means that the panel 2 is upwardly convexed at the transversely central part thereof when viewed from the front of the vehicle. The connections between the mobile drain channel 6 and the channel sliders 7, which also might have been represented by chained line, are however omitted for the simplification of representation.

Each rear stay 21 is pivotably connected at the lower part thereof through a support shaft 35 to the rear end of a tilt-up arm 33, and to the front end of a drain channel arm 34, which is pivotably attached at the rear end thereof to the drain channel slider 7. The front part of the tilt up arm is engaged with the elongate groove 13 as a cam groove therefor by means of front and rear pins 31, 32 as followers fixed thereto.

Figure 4:
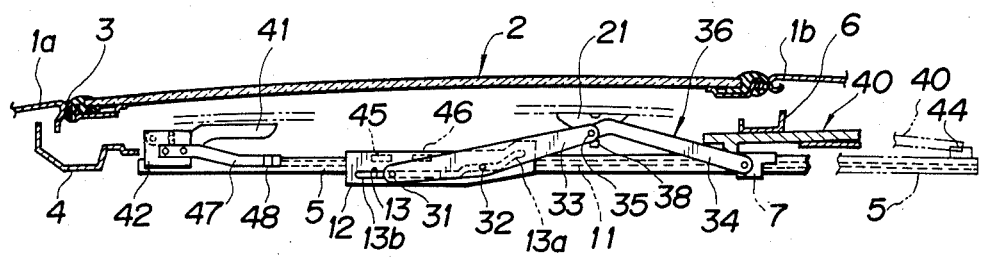
FIG. 4 is a side view of the essential part of the sliding roof of FIG. 3, as it is in a state where the sunshade is put in an open position thereof while the roof panel is left in the close position.
Figure 5:
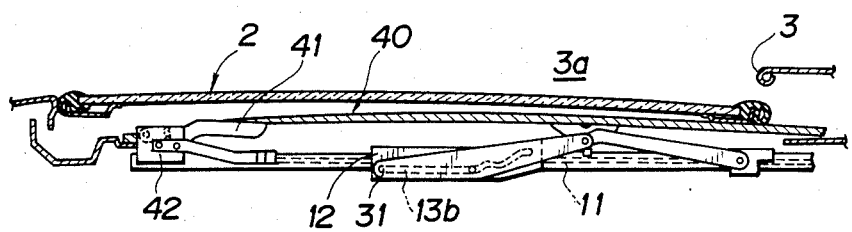
FIG. 5 is a side view of the essential part of the sliding roof of FIG. 3, as it is in a state where the roof panel is tilted down while the sunshade is put in the close position.
Figure 6:
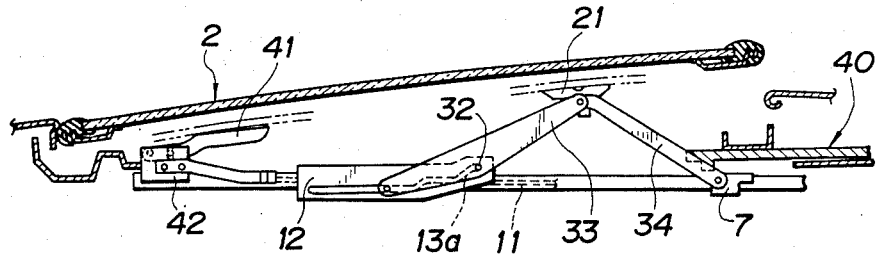
FIG. 6 is a side view of the essential part of the sliding roof of FIG. 3, as it is in a state where the roof panel is tilted up while the sunshade is put in the open position.

In this embodiment, a tilt-up mechanism 36 is constituted with the panel actuating tilt-up sliders 12, both of the arms 33, 34, and other minor components, and is adapted such that, by operation of the Bowden cables 11, the tilt-up sliders 12 are forced to longitudinally slide, while causing the arms 33, 34 to swing up and down, to thereby bring the roof panel 2 into a full-close position thereof, a tilt-down position thereof, and a tilt-up position thereof shown in FIGS. 3, 5, and 6, respectively. The tilt-up mechanism is further adapted such that, when the tilt-up sliders 12 are forced to further retreat from a position thereof shown in FIG. 5, the roof panel 2 is brought from the tilt-down position into a full-open position (not shown) thereof, where it is stored under the rear part 1b of the roof 1. Incidentally, designated by reference numeral 38 of FIG. 4 is either of a pair of sliding members adapted to be brought into engagement with respective grooves of the guide rails 5, 5 to thereby restrict the vertical movements of the arms 33, 34 when bringng the roof panel 2 into the full-open position under the rear part 1b of the roof 1.

The support of the front part of the roof panel 2 is effected with the respective rear parts of left and right front stays 41 disposed thereunder, which stays 41 are pivotably supported at the front parts thereof by a pair of front sliders 42 longitudinally slidably engaged with the guide rails 5, respectively. In this respect, designated by reference numeral 47 of FIG. 4 is either of a pair of leaf springs fixed at the front parts thereof to the front sliders 42. Each of spring 47 has formed in the rear part thereof a convex portion 48 engaged in a concave portion (not shown) formed in the side face of a corresponding one of the guide rails 5, to thereby effect the front end positioning of the roof panel 2. Such engagement of the convex portion 48 of the leaf spring 47 with the concave portion of the guide rail 5 is released by interference of the distal end part of a corresponding one of the Bowden cables 11, when actuating to rearwardly move the roof panel 2 from the full-close position.

In FIGS. 3 to 6, designated by reference numeral 40 is the sunshade made of a light-shielding material, which is disposed at a lower level than the mobile drain channel 6 and engaged at both sides thereof with the guide rails 5 so as to be longitudinally slidable between a position thereof below the roof opening 3a and another position thereof under the rear part 1b of the roof 1, However, when the roof panel 2 is put in the full-close position, the sunshade 40 is situated under the panel 2 so that rays of light as transmitted from outside through the panel 2 can be shielded.

For operatively moving the roof the Bowden cables 11, panel 2 are driven with a later-described motor, of which actuation is controlled such as by a sunshade sensor 44 as a limit sensor for detecting the sunshade 40, as it is put in a retreat limit position thereof, and by a tilt sensor 45 and a slide sensor 46 as position sensors for detecting either of the tilt-up sliders 12, as it is put in or moved beyond a predetermined position thereof, respectively.

In other words, the sunshade sensor 44 is installed on the rear end part of guide rail 5, to detect a full-open position of the sunshade 40.

The tilt sensor 45 is fixed on the transversely middle part of guide rail 5, as shown in FIGS. 7 and 8, to be operated by engagement with a cam portion 12a of tilt-up slider 12. More specifically, the sensor 45 comprises an elastically swingable engagement spring 45a as a follower in contact with the upper surface of tilt-up slider 12, and a microswitch 45b operable with the spring 45a. When slider 12 is put in a position thereof shown in FIGS. 3 and 4 or rearwardly moved therefrom, the engagement spring 45a is not yet brought into engagement with the cam portion 12a of slider 12 and hence the switch 45b is left off. When slider 12 is moved frontwards beyond the position, that is, to the left thereof in FIGS. 3 and 4, the spring 45a is caused to swing upwardly by the cam portion 12a, thus operating to turn on the switch 45b.

Though not shown in FIGS. 7 and 8, the slide sensor 46 is analogous in structure to the tilt sensor 45 and has a micro-switch operable with a follower in contact with tilt-up slider 12. However the relation between the on-off action of the sensor 46 and the position of tilt-up slider 12 is reversed to that between the sensor 45 and slider 12. In other words, when slider 12 is put in the position in FIGS. 3 and 4 or moved to the left therefrom, the switch of the sensor 46 is left off and, to the contrary, when slider 12 is moved to the right beyond the position of FIGS. 3 and 4, the switch is operated to be on.

Referring to FIGS. 1A and 1B, description will now be made of the constitution as well as the function of the aforementioned control circuit for controlling the motor actuating the Bowden cables 11 of the sliding roof device 100.

In FIG. 1A, designated by reference numeral 50 is the control circuit, and 51 is the motor of an electric type. The direction of conduction of the armature current of the motor 51 is controlled by means of a pair of select switches 52, 53, which consist of a pair of mobile contacts 52a, 53a operable to be brought into contact with ground terminals 52c, 53c and with supply terminals 52d, 53d and a pair of exciting coils 52b, 53b for operating the contacts 52a, 53a, rspectively. While the exciting coils 52b, 53b are not energized, the mobile contacts 52a, 53a are connected to the ground terminals 52c, 53c and, when the coils 52b, 53b are energized, the contacts 52a, 53a are brought into contact with the supply terminals 52d, 53d connected to a power source +B. The mobile contacts 52a, 53a are always connected to the motor 51.

The micro-switches 44, 45, 46, which all have a function of detecting a predetermined position of an object, are adapted to serve as the sunshade sensor, the tilt sensor, and the slide sensor, as described. The sunshade sensor 44 is adapted to become activated when the sunshade 40 is put in the full-open position (FIG. 4) and to be non-activated while the sunshade 40 is otherwise positioned. The tilt sensor 45 is non-activated while the roof panel 2 is kept in the full-close position (FIGS. 3 and 4), and becomes activated when the panel 2 enters a tilt-up position thereof (FIG. 6). The slide sensor 46 also remains off while the roof panel 2 is in the full-close position (FIGS. 3 and 4), whereas it becomes activated when tilt-up slider 12 is caused to retreat in the way of moving the panel 2 to the full-open position and at the full-open position of the panel 2.

The control circuit 50 includes manual switches 57 and 58 for manual operations, the former 57 being a close switch for panel closing operation, the latter 58 being a tilt-up/open select switch having a grounded mobile contact 58a normally put in a neutral position thereof. The contact 58a is manually operable to be brought into contact with a stationary terminal 58b for causing a tilt-up action of the panel 2 and with another stationary terminal 58c for opening the panel 2.

The sunshade sensor 44 is interposed between the tilt-up action oriented terminal 58b of the select switch 58 and a negative terminal of the exciting coil 52b, while the open action oriented terminal 58c of the switch 58 is connected to a negative terminal of the exciting coil 53b. The close switch 57 has two terminals: one being grounded, and the other being connected through the tilt sensor 45 and the slide sensor 46 to the negative terminals of the exciting coils 52b, 53b, respectively, and also grounded through a resistor 59 and a light-emitting diode 60 connected in series to each other.

Thus constituted control circuit 50 has a number of functions illustrated by a flow chart of FIG. 1B, in which three circular nodes represent the predetermined positions of the roof panel 2: (a) the tilt-up position, (b) the full-close position to be hereinafter simply called "close" position, and (c) the full-open position to be hereinafter called "open" position.

The close switch 57 is adapted, when operated, to bring the roof panel 2 into the close position, whether the panel 2 is in the tilt-up position or the open position when switch 57 is activated.

In the tilt-up / open select switch 58, the mobile contact 58a cooperates with the stationary terminal 58b to constitute a "tilt-up" switch adapted to bring the panel 2 into the tilt-up position by a single continuous operation, whether the panel 2 is in the open position or the close position when the switch 58 is activated, provided that the sunshade sensor 44 is turned on with the sunshade 40 moved to the retreat limit position as shown in FIG. 4.

Further, in the select switch 58, the mobile contact 58a cooperates with the other stationary terminal 58c to constitute an "open" switch adapted to bring the roof panel 2 into the open position by a single continuous operation, whether the panel 2 is in the tilt-up position or the close position when the switch 58 is activated.

As will be understood from the foregoing description, the tilt sensor 45 and the slide sensor 46 both remain off while the roof panel 2 is in the close position, and exclusively become on when the panel 2 is removed from the close position to the tilt-up position and to the open position, respectively.

Accordingly, while the roof panel 2 is in the close position, the light-emitting diode 60 remains deenergized, thus emitting no rays of light.

However, when the roof panel 2 is moved from the close position to the tilt-up or the open position, the corresponding one of the sensors 45, 46 becomes on, energizing the light-emitting diode 60, which thus becomes illuminant. The diode 60 is adapted to serve as an indicator for indicating that the panel 2 is out of the close position.

In this respect, the resistance 59 at the positive side of the light-emitting diode 60 is very large so that, even while for example the tilt sensor 45 is turned on, the exciting coil 53b of the select switch 53 has sent thereto an electric current of a smaller amperage than required for operation of the mobile contact 53a. The mobile contact 53a is thus not actuated to be brought into contact with the supply terminal 53d, so far as the close switch 57 or the "tilt-up" switch 58a–58b is not yet turned on.

As shown in FIG. 1B, the control circuit 50 has six modes of operation. These operation modes will be detailed below one by one together with associated circuit function.

Operation mode (i) for moving the roof panel 2 from the close position to the tilt-up position:

It is first of all supposed that the roof panel 2 is put in the close position, and the sunshade 40 is in the full-open position (FIG. 4), thus having turned on the sunshade sensor 44. Other circuit elements are as shown in FIG. 1A.

First, in the tilt-up / open select switch 58, when the mobile contact 58a is brought into contact with the terminal 58b, the exciting coil 52b of the select switch 52 is energized, connecting the mobile contact 52a, to the supply terminal 52d, thus sending an armature current I1 to the motor 51 in such a direction that causes the Bowden cables 11 to advance, forcing the tilt-up sliders 12 to also advance, so that the panel 2 is moved from the close position to the tilt-up position (FIG. 6).

Thus, only when the sunshade sensor 44 is turned on with the sunshade 40 put in the full-open position will the roof panel 2 be permitted to be brought into the tilt-up position by operation of the "tilt-up" switch 58a–58b. When the sunshade 40 is otherwise positioned, the sunshade sensor 44 is non-activated, thus failing to permit the roof panel 2 to be brought into the tilt-up position.

When the roof panel 2 is put in the tilt-up position, the tilt sensor 45 is turned on, whereas the select switch 52 becomes non-activated when the mobile contact 58a of the switch 58 is righted to the neutral position upon completion of the tilt-up operation.

Operation mode (ii) for moving the roof panel 2 from the tilt-up position to the close position:

Upon completion of the operation mode (i), when the close switch 57 is turned on, there is conducted an exciting current through the tilt sensor 45 as kept on and the close switch 57, which current runs through the exciting coil 53b of the select switch 53, connecting the mobile contact 53a to the terminal 53d, thus sending an armature current I2 to the motor 51 in such a direction that causes the Bowden cables 11 to retreat, also forcing the tilt-up sliders 12 to retreat, so that the roof panel 2 descends at the rear part thereof to take the close position. The motor 51 is stopped when the tilt sensor 45 is turned off with the tilt-up sliders 12 further rearwardly moved. Thus, by operation of the close switch 57, the roof panel 2 is now again brought into the close position (FIG. 4), and automatically stopped at this position.

Operation mode (iii) for moving the roof panel 2 from the close position to the open position:

When the roof panel 2 is desired to be moved from the close position to the open position, the tilt-up / open select switch 58 is to be operated so as to connect the mobile contact 58a with the terminal 58c. With such operation, the exciting coil 53b of the select switch 53 is energized, connecting the mobile contact 53a to the terminal 53d, thus sending the armature current I2 to the motor 51 in the direction that causes the Bowden cables 11 to retreat, also forcing the tilt-up sliders 12 to retreat, so that the roof panel 2 first tilts down (FIG. 5) and then retreats to take the open position. As described, when the tilt-up sliders 12 are situated in the rear of the position shown in FIGS. 3 and 4, the slide sensor 46 is kept on, whereas the "open" switch 58a–58c is turned off when the mobile contact 58a is righted to the neutral position upon completion of the opening operation.

Operation mode (iv) for moving the roof panel 2 from the open position to the close position:

While the roof panel 2 is in the open position, the slide sensor 46 is kept on. Under this condition, when the close switch 57 is turned on, there is conducted an exciting current through the slide sensor 46 as kept on and the close switch 57, which current runs through the exciting coil 52b of the select switch 52, connecting the mobile contact 52a to the terminal 52d, thus sending the armature current I1 to the motor 51 in the direction that causes the Bowden cables 11 to advance, also forcing the tilt-up sliders 12 to advance together with the roof panel 2. With advancement of the tilt-up sliders 12, the roof panel 2 comes to the position shown in FIG. 4, where the slide sensor 46 becomes non-activated, thus interrupting the conduction of electric current to the exciting coil 52b, stopping the motor 51, so that the panel 2 is automatically stopped at the close position.

In the above operation mode (iv), when the roof panel 2 is brought into the close position (FIG. 4) with the close switch 57 turned on, the slide sensor 46 becomes off, stopping the illumination of the light-emitting diode 60, whereby the completion of the movement of the panel 2 to the close position can be easily confirmed.

In this respect, also in the operation mode (ii), when the roof panel 2 is brought into the close position, the tilt sensor 45 becomes off, stopping the illumination of the light-emitting diode 60, whereby the completion of the movement of the panel 2 to the close position can be easily confirmed.

Operation mode (v) for continuously moving the roof panel 2 from the tilt-up position to the open position:

Under the condition that the roof panel 2 is put in the tilt-up position (FIG. 6), when the mobile contact 58a of the "open" switch 58a–58c is operated to be connected to the open action oriented terminal 58c, then the select switch 53 becomes activated, sending the armature current I2 to the motor 51 in the direction that causes the Bowden cables 11 to retreat, as described, so that the the panel 2 first tilts down (FIG. 5). While the "open" switch 58a–58c is kept on, the roof panel 2 continuously moves in the rearward direction to take the open position, whereas the "open" switch 58a–58c is turned off when the panel 2 is put in the open position.

Operation mode (vi) for continuously moving the roof panel 2 from the open position to the tilt-up position:

Under the condition that roof panel 2 is put in the open position and the sunshade sensor 44 is turned on with the sunshade 40 in the open position thereof, when the tilt-up / open select switch 58 is operated to connect the mobile contact 58a to the tilt-up action oriented terminal 58b, then the select switch 52 becomes activated, sending the armature current I1 to the motor 51 in the direction that causes the Bowden cables 11 to advance, as described, so that the panel 2 first closes (FIG. 4). While the "tilt-up" switch 58a–58b is kept on, the roof panel 2 further continuously moves to take the tilt-up position, whereas the "tilt-up" switch 58a–58b is turned off when the panel 2 is put in the tilt-up position.

Incidentally, in this embodiment, the motor 51 has an output shaft (not shown) thereof interconnected with the Bowden cables 11 by means of a slide clutch (not shown) of a suitable type, so that, in the operation modes (i) and (vi), the slide clutch exhibits a clutch function under such a condition that the "tilt-up" switch 58a–58b is erroneously or accidentally still kept on when the panel 2 is brought into the tilt-up position. Such function will be exhibited also under the condition that, in the operation modes (iii) and (v), the "open" switch 58a–58c is erroneously or accidentally still kept on by the driver even when the roof panel 2 is brought into the open position.

With reference to FIG. 2, there will be detailed below the constitution of an operation switch 70 into which the aforementioned manual switches 57, 58 are specifically substantiated in a combination manner.

The operation switch 70 comprises a seesaw switch 71 and pushbutton switch 72, which are both adapted to become activated when manually depressed and to be automatically righted to neutral positions thereof, by means of a spring (not shown), to thereby become non-activated when released from such depression.

Incidentally, in the foregoing embodiment, the sunshade sensor 44 is necessarily provided to detect a predetermined position of the sunshade 40. In this respect, when applying the present invention to a sliding roof device without sunshade, there may employed a simplified modification of the above embodiment, in which at a point corresponding to the sensor 44 the circuitry is always made conductive.

As will be understood from the foregoing description, with the control circuit 50 according to the embodiment described, besides respective panel operations of the modes (i), (ii), (iii) and (iv) which are analogous to those possible with the control circuit according to the U.S. Pat. No. 3,702,430, there are permitted additional operations of the modes (v) and (vi), each of which can be effected as a single continuous switching operation to thereby continuously bring the roof panel 2 from the tilt-up position to the open position or vice versa.

Moreover, according to the embodiment, the sensors 45, 46 for detecting predetermined positions of tilt-up slider 12 are installed on stationary rail 5, so that the predetermined position of slider 12 corresponding to the close position of the panel 2 can be firmly detected irrespective of inherent extension of the cables 11 that may develop with years, as well as of inavoidable thermal expansion thereof.

Incidentally, in the control circuit 50, the close switch 57 (72) is inherently utilized to return the roof panel 2 from either the tilt-up position or the open position to the close position. In this respect, however, in the circuit 50 which employs the light-emitting diode 60 that becomes off when the panel 2 is brought into the close position, the tilt-up / open select switch 58 (71) may be adapted to be operated in such a manner that, exemplarily of the movement of the panel 2 from the open position to the tilt-up position, the operation is once interrupted to put the panel 2 in the close position.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. In a control circuit (50) for a sliding roof device (100) having:
   a roof panel (2) adapted to open and close a roof opening (3a) defined by an opened part (3) of a roof (1) and to be selectively adjustable between a close position thereof, a tilt-up position thereof, and an open position thereof;
   panel transfer means (11, 12, 13b, 31, 33, 34, 7, 21) for moving said roof panel between said close position and said open position;
   panel tilt-up means (11, 12, 13a, 32, 33, 34, 7, 21) for moving said roof panel between said close position and said tilt-up position; and
   reversible electric motor means (51) for driving said panel transfer means and said panel tilt-up means,
   said control circuit including:
   first operation switch means (58) for actuating said motor means to thereby have said roof panel moved from said close position to said tilt-up position and from said close position to said open position; and
   second operation switch means (57) for actuating said motor means to thereby have said roof panel moved from said tilt-up position and said open position to said close position,
   an improvement comprising:
   said first operation switch means (58) being adapted for a single continuous operation thereof for actuating said motor means to thereby have said roof panel continuously moved from said tilt-up position to said open position and from said open position to said tilt-up position.

2. A control circuit according to claim 1, further comprising:
   a first select switch (52) for actuating said motor means, as it is energized, to thereby have said roof panel continuously moved in the frontward direction of said roof;
   a second select switch (53) for actuating said motor means, as it is energized, to thereby have said roof panel continuously moved in the rearward direction of said roof; and
   said first operation switch means (58) being operatively connected to said first and said second select switches (52, 53) and thereby adapted to selectively and exclusively operate either of said first and said second select switches (52, 53).

3. A control circuit according to claim 2, wherein:
   said second operation switch means (57) is operatively interconnected with:
   said first select switch (52) through a first sensor (46) adapted to close when said roof panel is located in said open position rather than said close position; and
   said second select switch (53) through a second sensor (45) adapted to close when said roof panel is located in said tilt-up position rather than said close position, whereby, when said second switch means (57) is operated, either of said first and said second select switches (52, 53) is selectively and exclusively operated, so that said roof panel, whether it has been put in said open position or said tilt-up position, is brought into said close position and, when put in said close position, automatically stopped.

4. A control circuit according to claim 3, further comprising:
a panel position indicating element (60) adapted to be operated when either of said first and said second sensors (46, 45) is closed.

* * * * *